(12) United States Patent
Ding et al.

(10) Patent No.: US 12,412,471 B2
(45) Date of Patent: Sep. 9, 2025

(54) WRONG-WAY DRIVING MODELING

(71) Applicant: Waymo LLC, Mountain View, CA (US)

(72) Inventors: Kai Ding, Santa Clara, CA (US); Stéphane Ross, San Jose, CA (US); Chenjie Yang, Mountain View, CA (US); Xiaoting Yin, Millbrae, CA (US)

(73) Assignee: Waymo LLC, Mountain View, CA (US)

( * ) Notice: Subject to any disclaimer, the term of this patent is extended or adjusted under 35 U.S.C. 154(b) by 610 days.

(21) Appl. No.: 17/706,063

(22) Filed: Mar. 28, 2022

(65) Prior Publication Data

US 2023/0326335 A1    Oct. 12, 2023

(51) Int. Cl.
| | |
|---|---|
| *G08G 1/056* | (2006.01) |
| *B60W 30/095* | (2012.01) |
| *B60W 30/10* | (2006.01) |
| *G06N 3/04* | (2023.01) |
| *G06N 5/01* | (2023.01) |

(52) U.S. Cl.
CPC ........... *G08G 1/056* (2013.01); *B60W 30/095* (2013.01); *B60W 30/10* (2013.01); *G06N 3/04* (2013.01); *G06N 5/01* (2023.01); *B60W 2555/60* (2020.02)

(58) Field of Classification Search
CPC .... G08G 1/056; B60W 30/095; B60W 30/10; B60W 2555/60; B60W 60/0027; G06N 3/04; G06N 5/01; G06N 3/09; G06N 20/20
See application file for complete search history.

(56) References Cited

U.S. PATENT DOCUMENTS

| | | | |
|---|---|---|---|
| 10,421,453 | B1 | 9/2019 | Ferguson et al. |
| 10,621,448 | B2 | 4/2020 | Schubert et al. |
| 10,839,683 | B2 | 11/2020 | Sambo et al. |
| 10,860,025 | B2 | 12/2020 | Cunningham |
| 11,551,548 | B1* | 1/2023 | Nayak .............. G08G 1/096827 |
| 2019/0371168 | A1* | 12/2019 | Sambo ................... G08G 1/056 |
| 2020/0402396 | A1 | 12/2020 | Geisler |
| 2023/0360533 | A1* | 11/2023 | Kashihara ................ G08G 1/09 |

* cited by examiner

*Primary Examiner* — Rami Khatib
(74) *Attorney, Agent, or Firm* — Botos Churchill IP Law

(57) ABSTRACT

Aspects of the disclosure provide methods of modeling wrong-way driving of road users. For instance, log data including an observed trajectory of a first road user may be accessed. A first set of candidate lane segments for wrong-way driving may be identified from map information. A second set of candidate lane segments for not wrong-way driving may be identified from the map information. For each candidate lane segment in the first set and in the second set, a distance cost between the candidate lane segment and the observed trajectory may be determined. A candidate lane segment may be selected from at least one of the first set or the second set based on the determined distance costs. The selected candidate lane segment may be used to train a model to provide a likelihood of a second road user being engaged in wrong-way driving in a lane.

18 Claims, 14 Drawing Sheets

WRONG-WAY DRIVING MODELING

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

BRIEF SUMMARY

Aspects of the disclosure provide a method of modeling wrong-way driving of road users. The method includes accessing, by one or more processors of one or more server computing devices, log data including an observed trajectory of a first road user; identifying, by the one or more processors, from map information, a first set of candidate lane segments for wrong-way driving; identifying, by the one or more processors, from the map information, a second set of candidate lane segments for not wrong-way driving; for each candidate lane segment in the first set and in the second set, determining, by the one or more processors, a distance cost between the candidate lane segment and the observed trajectory; selecting, by the one or more processors, a candidate lane segment from at least one of the first set or the second set based on the determined distance costs; and using, by the one or more processors, the selected candidate lane segment to train a model to provide a likelihood of a second road user being engaged in wrong-way driving in a lane.

In one example, identifying the first set includes using a first threshold distance from the observed trajectory. In this example, the first threshold distance is a radial distance. In addition or alternatively, identifying the second set includes using a second threshold distance from the observed trajectory. In this example, the second threshold distance is greater than the first threshold distance. In another example, the method also includes assigning a value to the selected candidate lane segment based on whether the candidate lane segment is from the first set or the second set. In addition, the value indicates that wrong-way driving occurred when the selected candidate lane segment is from the first set. In addition or alternatively, the value indicates that wrong-way driving did not occur when the selected candidate lane segment is from the second set. In another example, the observed trajectory includes one or more locations, and each distance cost for a particular candidate lane segment of the first set or the second set is determined by taking an average of distances between each location of the observed trajectory and a closest location on the particular candidate lane segment. In another example, each distance cost for the first set is determined further based on a heading cost. In this example, the heading cost for a given candidate lane segment of the first set is determined based on a cosine of an angular difference between a heading of the observed trajectory and a heading of the given candidate lane segment adjusted 180 degrees. In this addition, the heading cost for a given candidate lane segment of the second set is determined based on a cosine of an angular difference between a heading of the observed trajectory and a heading of the given candidate lane segment. In another example, the model is trained to provide likelihoods for bicyclists. In another example, wherein the model is trained to provide likelihoods for vehicles. In another example, the model is a decision tree model. In another example, the model is a deep neural network. In another example, the method also includes providing the model to an autonomous vehicle in order to enable the autonomous vehicle to estimate likelihoods of road users being engaged in wrong-way driving. In another example, the selected candidate lane segment has a lowest of the determined distance costs.

Another aspect of the disclosure provides a system for modeling wrong-way driving of road users. The system comprising one or more processors configured to: access log data including an observed trajectory of a first road user; identify from map information, a first set of candidate lane segments for wrong-way driving; identify from the map information, a second set of candidate lane segments for not wrong-way driving; for each candidate lane segment in the first set and in the second set, determine a distance cost between the candidate lane segment and the observed trajectory; select a candidate lane segment from at least one of the first set or the second set based on the determined distance costs; and use the selected candidate lane segment to train a model to provide a likelihood of a second road user being engaged in wrong-way driving in a lane.

In this example, the one or more processors are further configured to provide the model to an autonomous vehicle in order to enable the autonomous vehicle to estimate likelihoods of road users being engaged in wrong-way driving.

DETAILED DESCRIPTION

Overview

Figure 1:
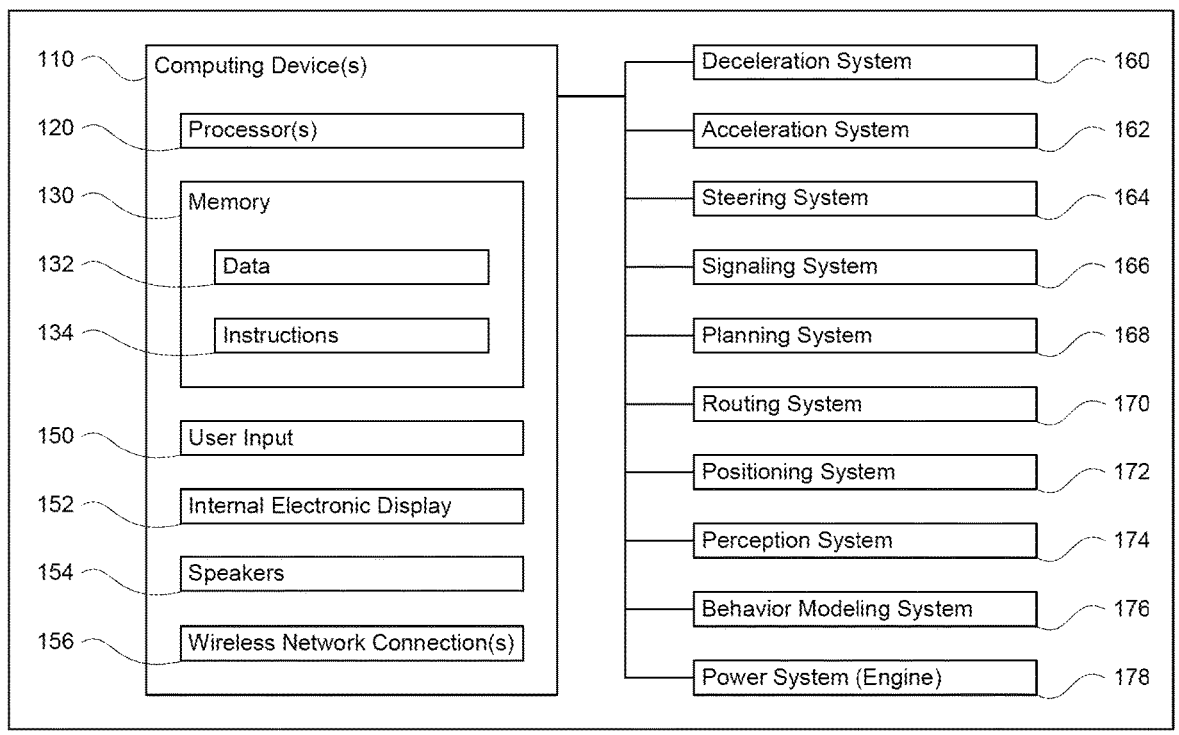
FIG. 1 is a functional diagram of an example vehicle in accordance with an exemplary embodiment.

The technology relates to modeling wrong-way driving of other agents or road users such as vehicles and bicyclists. For instance, an autonomous vehicle's behavior modeling system may generate multiple predicted trajectories with probabilities in order to model all possible paths each road user may take in the near-to-long term future. The more likely a road user will follow a trajectory, the higher the probability or likelihood that the road user may follow that predicted trajectory. These predicted trajectories and their likelihoods may be used by the autonomous vehicle's planning system to determine how to control the autonomous vehicle safely by avoiding such other road users. Typical behavior modeling system may not necessarily take into account wrong-way driving, for instance because it is not likely to be encountered often by autonomous vehicles. As such, by modeling wrong-way driving, this information may be used to generate predicted trajectories and/or the likelihoods of those predicted trajectories which take into account wrong-way driving. This, in turn, may be used to generate more well-informed trajectories and thereby improve the safety of autonomous vehicles as well as the comfort of passengers of those autonomous vehicles.

In order to generate the model, log data may be accessed by one or more server computing devices for processing. This log data may include data generated by the various systems of a vehicle, such as an autonomous vehicle, while the vehicle is being operated in a manual driving mode or an autonomous driving mode. For instance, the log data may include sensor data generated by a perception system. The log data may also include the trajectories of paths that objects including road users such as other vehicles and bicyclists have taken over time.

In order to train the model, log data for a plurality of road users may be classified or labeled as wrong-way driving occurred or wrong-way driving not occurred. Other similar classifications may also be used. In this regard, the observed trajectories for road users of the same or a similar type may be manually or automatically labeled.

The automatic labeling process may involve the server computing devices identifying a first set of one or more wrong-way candidate lane segments within a first threshold distance of an observed trajectory of a road user. For each lane within the first threshold distance, only a single lane segment (for example, the closest to the observed trajectory) may be included in the first set. The lane segments and lanes may be predefined in map information.

For each candidate lane segment of the set, the server computing devices may determine a distance cost with respect to the observed trajectory of the object. The distance cost may be determined by taking an average of the distances between each of the locations of the observed trajectory and a corresponding closest point on the candidate lane segment. An additional penalty or cost may be determined based on a heading difference between the observed trajectory and the candidate lane segment.

Simply selecting the candidate lane segment that best matches the observed trajectory or rather, having the lowest distance cost may not necessarily be sufficient for automatic labeling as it is possible that the road user is not doing wrong-way driving. To handle this, a second set of one or more not-wrong-way candidate lanes may include additional candidate lanes. These additional candidate lanes may be identified based on a second threshold distance from the observed trajectory.

Again, a distance cost may be determined for each candidate lane of the second set by taking an average of the distances between each of the locations of the observed trajectory and a corresponding closest point on the candidate lane segment. An additional penalty or cost may be determined based on a heading difference between the observed trajectory and a heading of the candidate lane segment. For candidate lane segments in the first set, the heading used to determine the distance cost may be adjusted 180 degrees for wrong way driving, and for candidate lane segments in the second set, the heading used to determine the distance cost may be the heading defined in the map information.

The candidate lane segment of the first and second sets that best matches the observed trajectory or rather, having the lowest distance cost may be associated with the road user. If the candidate lane segment is of the first set, the log data for the road user may be labeled as wrong-way driving observed. If the candidate lane segment is of the second set, the log data for the road user may be labeled as wrong-way driving not-observed. The candidate lane segment or the lane may also be associated with the labels and/or log data for the road user.

The labels and log data may then be used to train a model. The log data, including for instance the observed trajectories of road users and map information may be used as training inputs, and the labels and associated lanes may be used as training outputs. The model may be trained to provide a list of candidate lanes for each road user and an estimate of how likely the road user is to be engaged in wrong-way driving.

The model (or models) may then be provided to an autonomous vehicle in order to enable the autonomous vehicle to determine whether detected road users and their observed trajectories are engaged in wrong-way driving. For instance, the model or models may be incorporated into the autonomous vehicle's behavior modeling system in order to provide a likelihood that the road user is engaged in wrong-way driving in any one of a plurality of candidate lanes.

As noted above, the features described herein may provide for the modeling of wrong-way driving of other agents or road users such as vehicles and bicyclists. This may enable autonomous vehicles to predict the future behavior of these road users which may improve the safety of autonomous vehicles as well as the comfort of passengers of those autonomous vehicles.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. An autonomous vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (for example, be updated) overtime.

As described herein, in a semi or partially autonomous driving mode, even though the vehicle assists with one or more driving operations (for example, steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (for example garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (for example, one or more of a button, mouse, keyboard, touch screen and/or microphone), various electronic displays (for example, a monitor having a screen or any other electrical device that is operable to display information), and speakers 154 to provide information to a passenger of the autonomous vehicle 100 or others as needed. For example, internal display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination location using map information. Planning system 168 may be used by computing device 110 in order to generate short-term trajectories that allow the vehicle to follow routes generated by the routing system. In this regard, the planning system 168 and/or routing system 166 may store detailed map information, for example, pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2A:
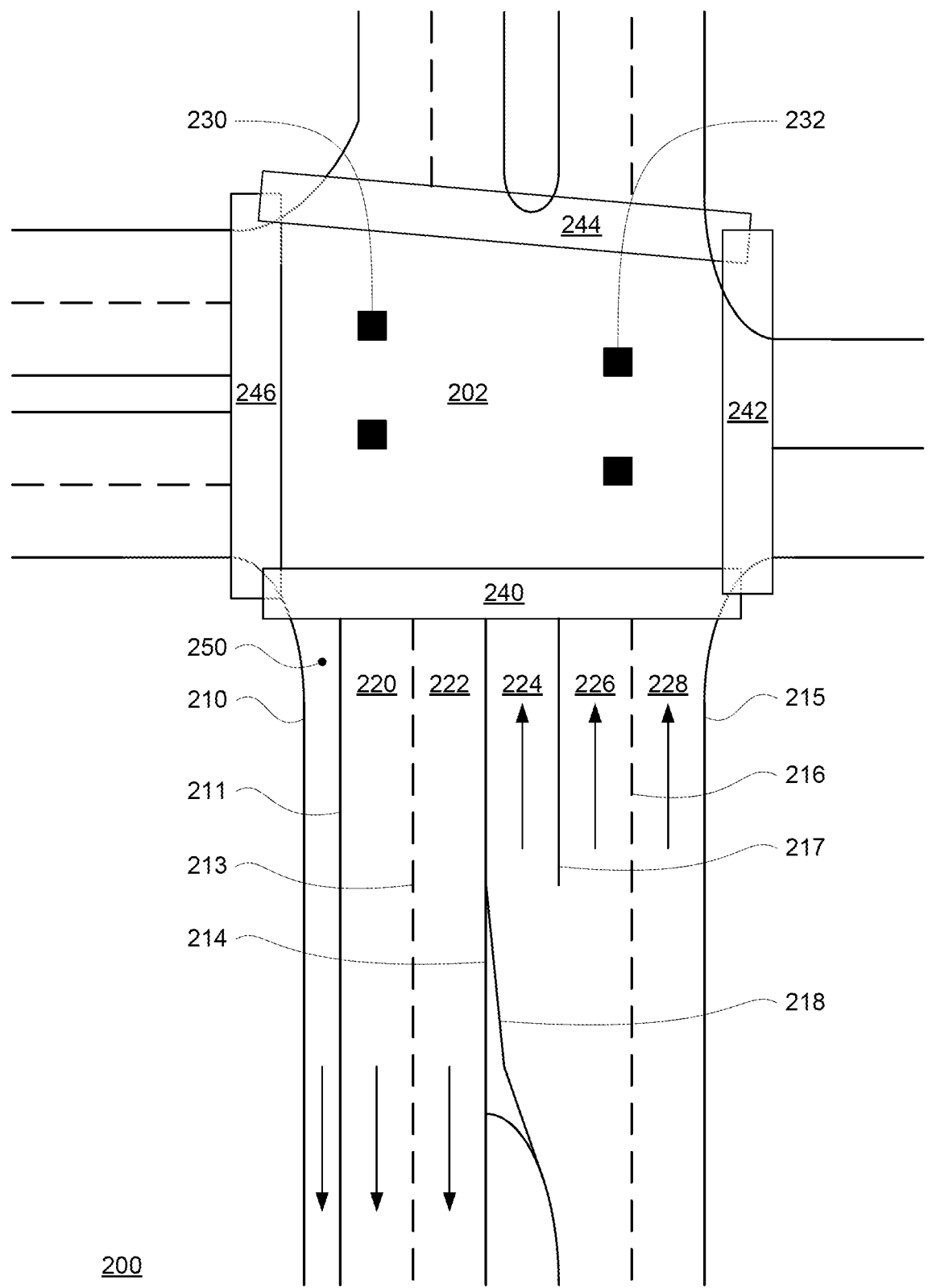
FIG. 2 is an example of map information in accordance with aspects of the disclosure.
Figure 2B:
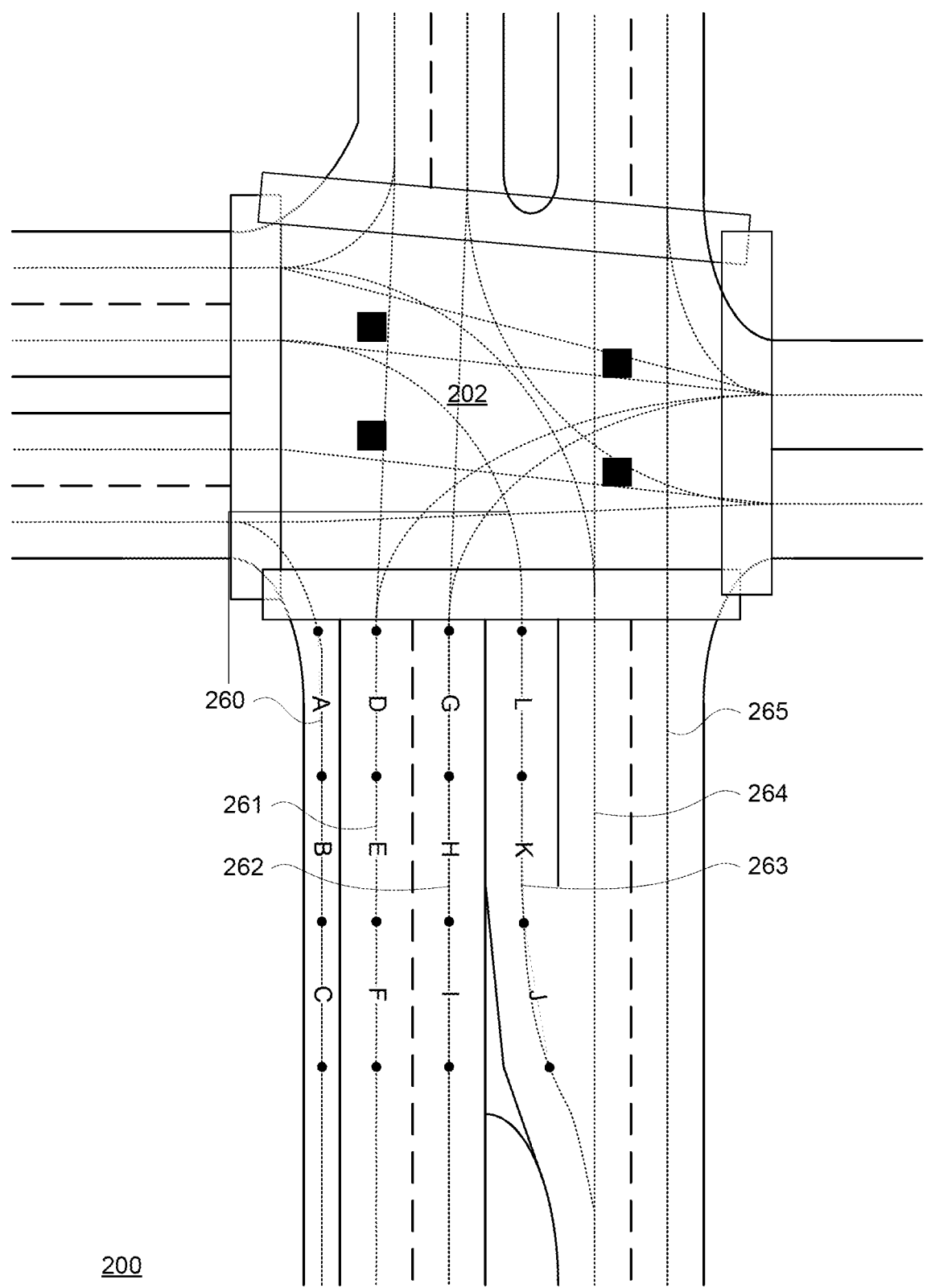

FIGS. 2A and 2B is an example of map information 200 for a small section of roadway including intersection 202. FIG. 2A depicts a portion of the map information 200 that includes information identifying the shape, location, and other characteristics of lane markers or lane lines 210, 211, 212, 213, 214, 215, 216, 217, 218 which define the boundaries of lanes 220, 222, 224, 226, 228, as well as shoulder area 250. In this regard, some areas which may not necessarily be lanes (for example shoulder areas) may be identified as drivable areas (for example, lanes). In this example, the map information also includes other features of intersection 202 such as traffic control devices including traffic signal lights 230, 232, as well as crosswalk areas 240, 242, 244, 246. In addition to the aforementioned features and information, the map information may also include information that identifies the direction of traffic for each lane (represented by arrows in FIG. 2A) as well as information that allows the computing devices 110 to determine whether the vehicle has the right of way to complete a particular maneuver (for example, complete a turn or cross a lane of traffic or intersection).

Turning to FIG. 2B, the map information may also include information identifying the center points of lanes as well as paths through the intersection 202. These center points, when linked together, may form paths within lanes that the autonomous vehicle can follow to correctly position itself within a lane and/or through an intersection (for example, intersection 202). As shown in FIG. 2B, paths 260, 261, 262, 263, 264, 265 are represented by dashed lines. Each of these paths corresponds to a respective lane or shoulder area. For example, path 260 corresponds to shoulder area 250, path 261 corresponds to lane 220, path 262 corresponds to lane 222, path 263 corresponds to lane 224, path 264 corresponds to lane 226, and path 265 corresponds to lane 228.

These paths may be broken into smaller segments (for example, smaller groups of center points) or lane segments. As an example, lane segment may span 12 meters or more or less long depending upon the characteristics (or simply granularity) of the map information. For instance, as shown in FIG. 2B, a plurality of lane segments A, B, C, D, E, F, G, H, I, J, K, L are depicted. In this example, lane segments A, B, C which represent a portion of path 260, lane segments D, E, F represent a portion of path 261, lane segments G, H, I represent a portion of path 262, and lane segments J, K, L represent a portion of path 263.

Each of these lane segments has an overlapping starting and/or end point with an adjacent lane segment depending upon the direction of the lane to which the lane segment corresponds. For example, lane segment A ends at the start of lane segment B, which ends at the start of lane segment C, etc. Lane segment D ends at the start of lane segment E, which ends at the start of lane segment F, etc. Lane segment G ends at the start of lane segment H, which ends at the start of lane segment I, etc. Similarly, lane segment J which corresponds to lane 224 ends at the start of lane segment K, which ends at the start of lane segment L, etc.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (for example, latitude, longitude, altitude, etc.), an ending graph node having a specific geographic location (for example, latitude, longitude, altitude, etc.), and a direction. This direction may refer to a direction the autonomous vehicle 100 must be moving in in order to follow the edge (for example, a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (for example, a location of a current node) to a destination location. Routes may be generated using a cost-based analysis which attempts to select a route to the destination location with the lowest cost. Costs may be assessed in any number of ways such as time to the destination location, distance traveled (each edge may be associated with a cost to traverse that edge), types of maneuvers required, convenience to passengers or the vehicle, etc. Each route may include a list of a plurality of nodes and edges which the vehicle can use to reach the destination location. Routes may be recomputed periodically as the vehicle travels to the destination location.

The map information used for routing may be the same or a different map as that used for planning trajectories. For example, the map information used for planning routes not only requires information on individual lanes, but also the nature of lane boundaries (for example, solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (for example, because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
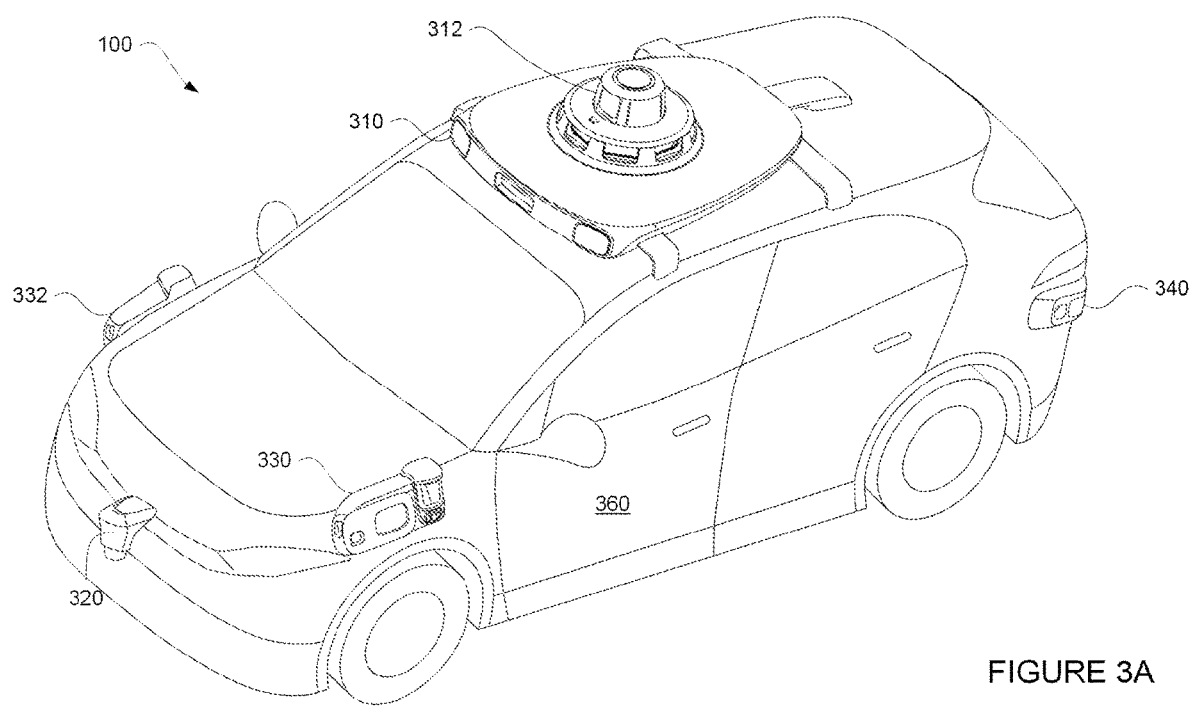
FIG. 3A-3B are example external views of a vehicle in accordance with aspects of the disclosure.
Figure 3B:
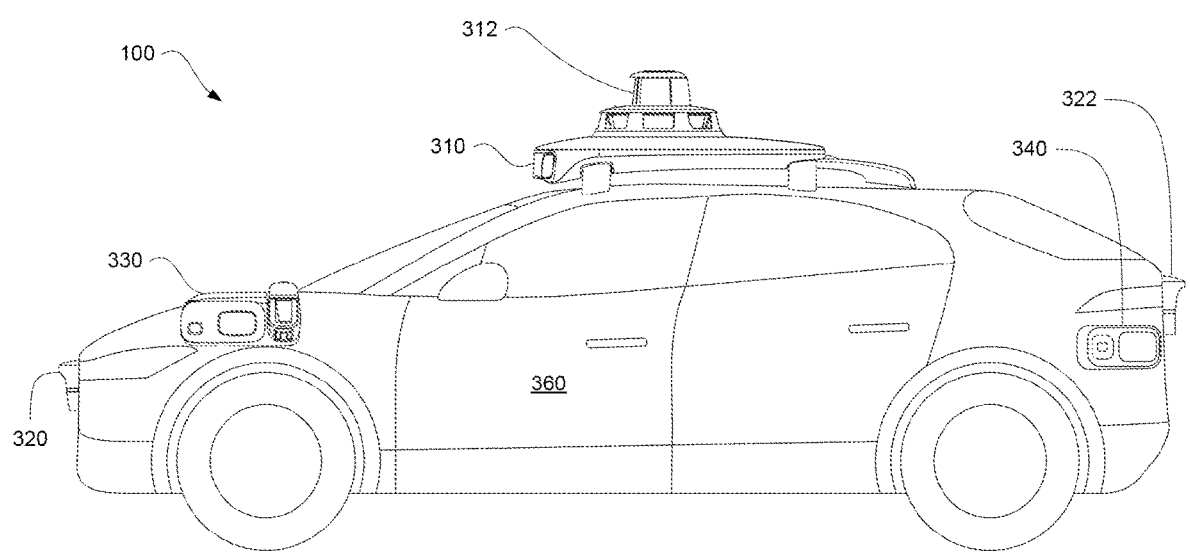

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (for example, the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (for example, future behavior predictions or predicted future trajectories). In this regard, different models may be used for different types of objects, such as pedestrians, bicyclists, vehicles, etc. The behavior predictions or predicted trajectories may be a list of positions and orientations or headings (for example, poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination location. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (for example, by supplying fuel or other energy to the engine or power system 178 by acceleration system 162), decelerate (for example, by decreasing the fuel supplied to the engine or power system 178, changing gears, and/or by applying brakes by deceleration system 160), change direction (for example, by turning the front or rear wheels of autonomous vehicle 100 by steering system 164), and signal such changes (for example, by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
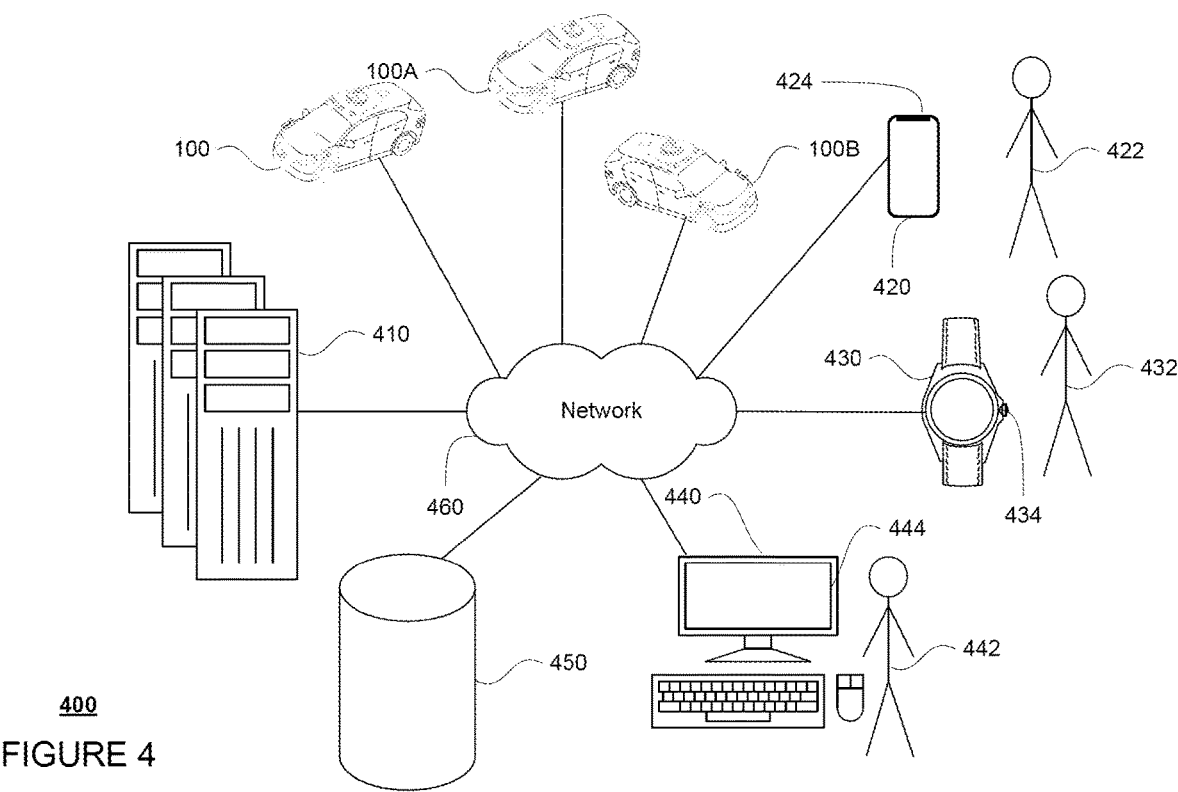
FIG. 4 is a pictorial diagram of an example system in accordance with aspects of the disclosure.
Figure 5:
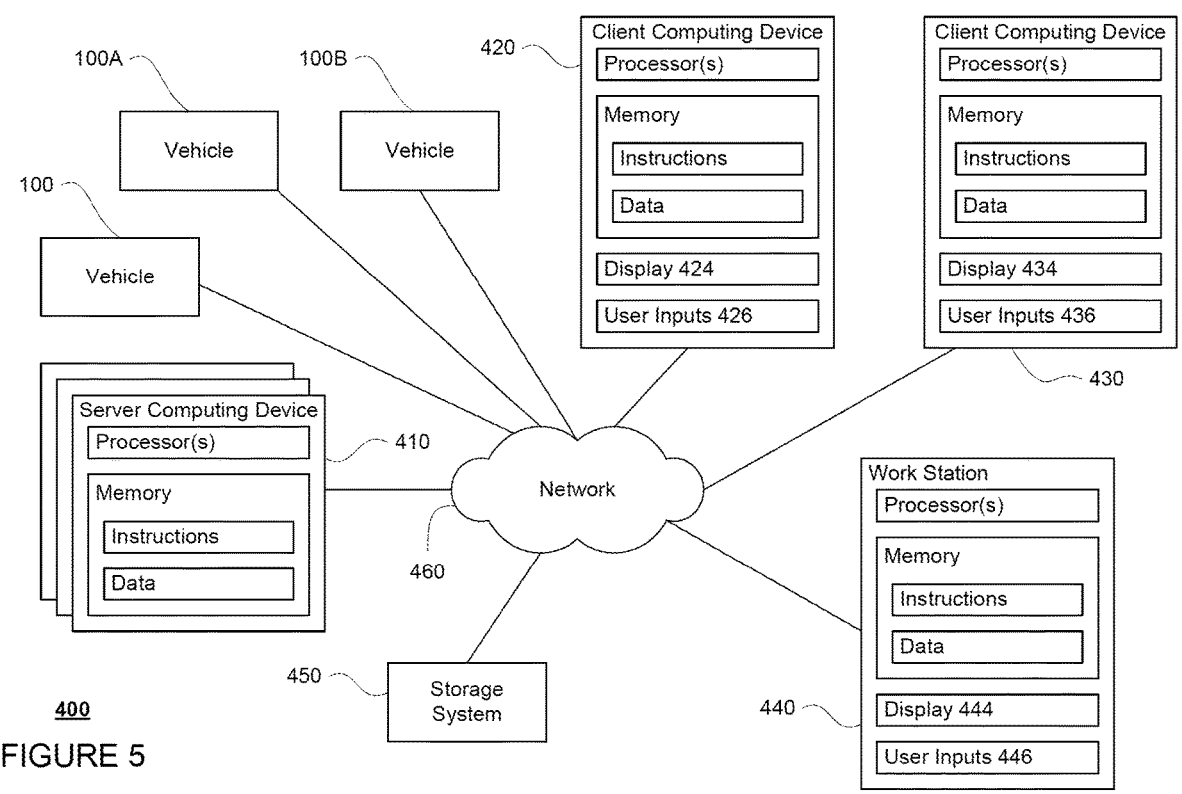
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, for example, a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

The server computing devices 410 may also track the status of the vehicles of the fleet using information that is periodically broadcast by the vehicles, specifically requested by the server computing devices provided by the vehicles, or using other methods of tracking the states of a fleet of autonomous vehicles. This periodically broadcast information may include messages providing all state information for a given vehicle. For instance, state messages may be self-consistent and generated based on rules about packaging the messages from various systems of the vehicles. As an example, the messages may include vehicle pose (for example, position/location and orientation), lane information (for example, in what lane the vehicle is currently traveling), current route, estimated time of arrival at the vehicle's current destination location (for example, how long to reach a pickup or destination location for a passenger), as well as other information, such as whether the vehicle is currently providing transportation services, experiencing any errors or problems, etc. In this regard, the server computing devices 410 may track the vehicle's progress with regard to its current route as well as estimate when the vehicle is likely to arrive at the vehicle's current destination location. This state information may be stored, for example, in the storage system 450.

As shown in FIG. 4, each client computing device 420, 430 may be a personal computing device intended for use by a user 422, 432 and have all of the components normally used in connection with a personal computing device including a one or more processors (for example, a central processing unit (CPU)), memory (for example, RAM and internal hard drives) storing data and instructions, a display such as displays 424, 434, 444 (for example, a monitor having a screen, a touch-screen, a projector, a television, or other device that is operable to display information), and user input devices 426, 436, 446 (for example, a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example, the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of an autonomous vehicle. In other words, user 422 may represent a passenger or a scheduler as discussed herein. In addition, client computing device 430 may represent a smart watch for a passenger of an autonomous vehicle. In other words, user 432 may represent a passenger or a scheduler as discussed herein. The client computing device 440 may represent a workstation for an operations person, for example, a remote assistance operator or other operations personnel who may provide remote assistance to an autonomous vehicle and/or a passenger. In other words, user 442 may represent an operator (for example, operations person) of a transportation service utilizing the autonomous vehicles 100, 100A, 100B. Although only a few passengers, schedulers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc.

Storage system 450 may store various types of information as described in more detail below. For instance, the storage system 450 may store log data. This log data may include data generated by the various systems of a vehicle, such as an autonomous vehicle, while the vehicle is being operated in a manual driving mode or an autonomous driving mode. For instance, the log data may include sensor data generated by a perception system. As an example, the sensor data may include raw sensor data as well as labels identifying defining characteristics of perceived objects such as shape, location, orientation, speed, etc. of objects such as vehicles, pedestrians, bicyclists, vegetation, curbs, lane lines, sidewalks, crosswalks, buildings, etc. Thus, the log data may also include the trajectories of paths that objects including road users such as other vehicles and bicyclists have taken over time. For example, a ground truth or observed trajectory of an object may include a series of locations and times (for example, date stamps) and corresponding observer characteristics for that object such as speed, heading, orientation, etc. for each of those locations.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
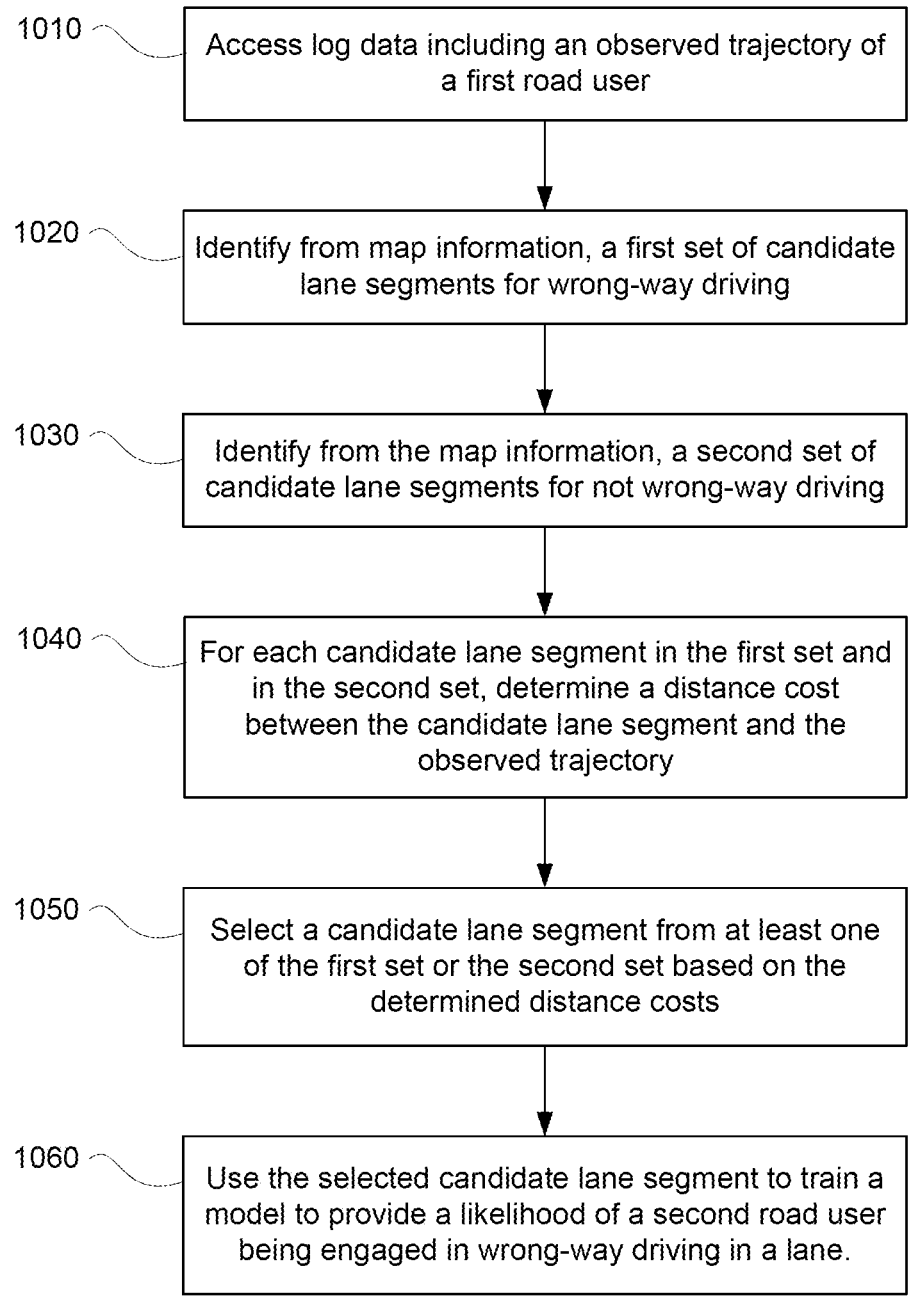
FIG. 10 is an example flow diagram in accordance with aspects of the disclosure.

FIG. 10 provides an example flow diagram 1000 for modeling wrong-way driving of road users, which may be performed by one or more processors, such as the one or more processors of the server computing devices 410. As shown in block 1010, log data including an observed trajectory of a first road user is accessed. In order to generate or rather to train the model, the log data of the storage system 450 may be accessed by one or more server computing devices 410 for processing. In this regard, the log data may include observed paths or trajectories of a plurality of road users may be classified or labeled as wrong-way driving occurred or wrong-way driving not occurred. Other similar classifications may also be used. In this regard, the observed trajectories for road users of the same or a similar type (for example, vehicles or bicyclists) may be manually or automatically labeled. The entire observed trajectory may be used, however, observed trajectories that may be too short (for example, less than 30 meters or more or less) may be discarded, filtered, or ignored.

Figure 6:
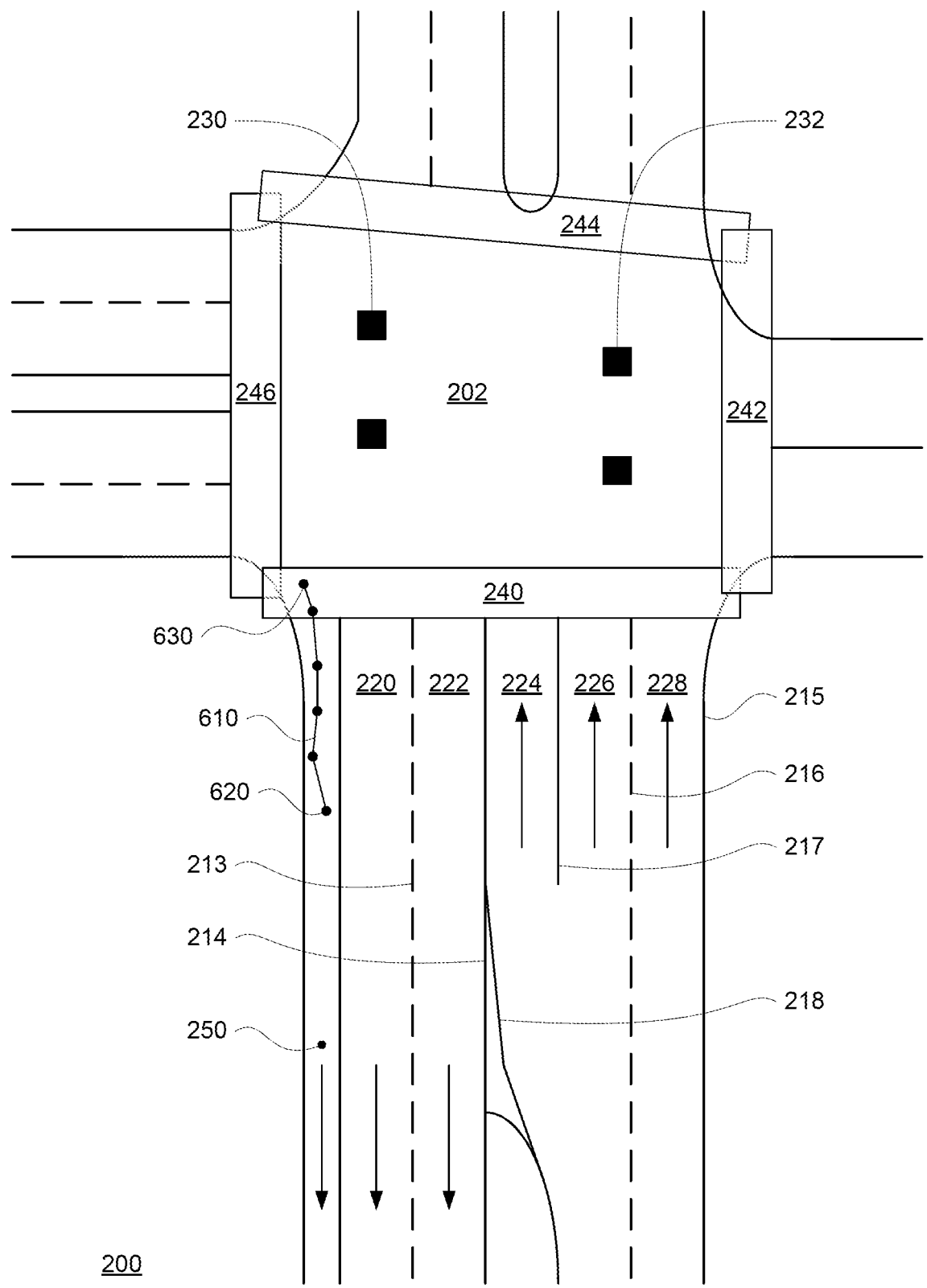
FIG. 6 is an example of map information and log data in accordance with aspects of the disclosure.

FIG. 6 is an example representation of log data overlaid onto the map information 200 of FIG. 2A. In this example, the log data includes an observed trajectory 610 which starts at location 620 and ends at location 630. The observed trajectory includes a plurality of locations at which an object was observed by the perception system of an autonomous vehicle, such as perception system 174 of autonomous vehicle 100. Each location is also associated with heading information (for example, the observed direction in which the object was oriented or moving). In this example, the road user was observed moving generally within the shoulder area 250 and following a path of the observed trajectory 610.

Figure 7A:
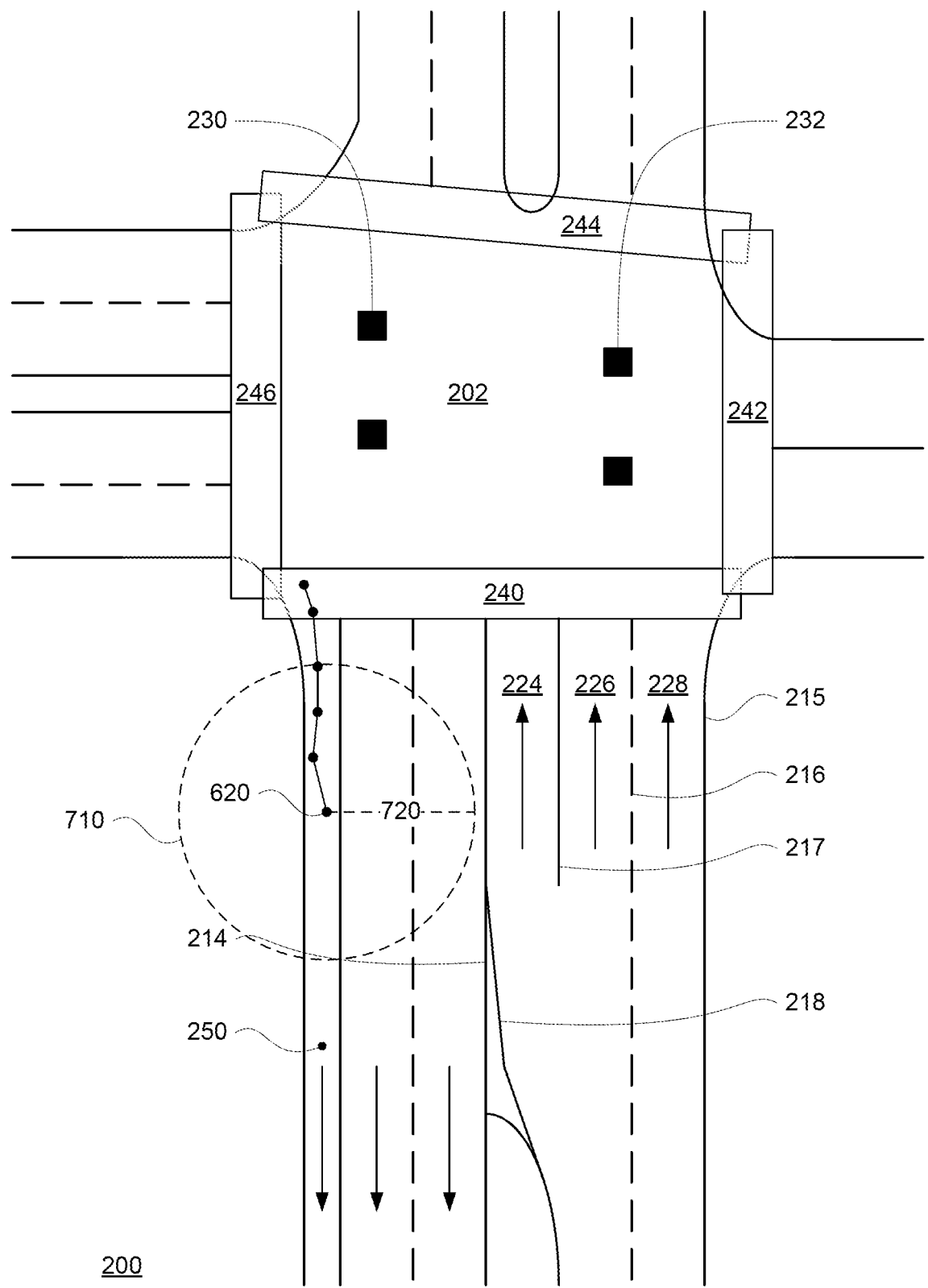
FIG. 7A is an example of map information, log data, and a threshold area in accordance with aspects of the disclosure.

Returning to FIG. 10, at block 1020, a first set of candidate lane segments for wrong-way driving are identified from the map information. The automatic labeling process may involve the server computing devices identifying a first set of one or more wrong-way candidate lane segments within a first threshold distance of an observed trajectory of a road user. As an example, this first threshold distance may be a radial distance 6 meters, 8 meters, 10 meters or more or less. For each lane within the first threshold distance, one or more lane segments may be included in the first set. In some instances, for each lane within the first threshold distance, only a single lane segment, such as the closest to the first observed location of the observed trajectory may be included in the first set. For example, turning to FIG. 7A, the area 710 represents the area within a first threshold distance 720 from the observed trajectory 610 at location 620. In this example, location 620 is the first observed location of the road user in the observed trajectory.

Figure 7B:
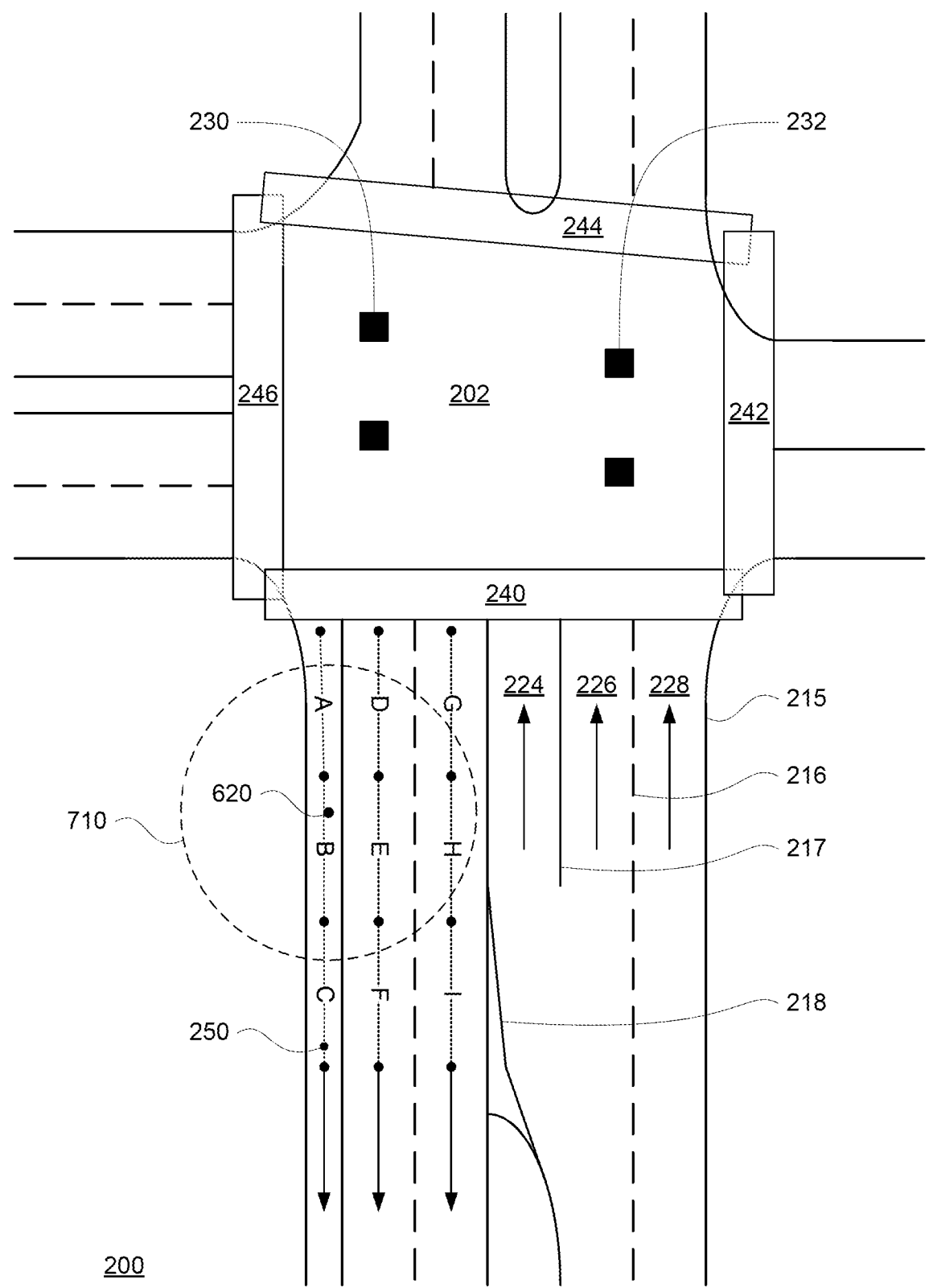
FIG. 7B is an example of map information, a threshold area and other data in accordance with aspects of the disclosure.

Turning to FIG. 7B, each of lane segments A, B, C, D, E, F, G and H may each be at least partially within the area 710 of the first threshold distance 720 of the observed trajectory 610 at location 630. In this regard, each of these lane segments may be included in a first set of candidate lane segments for wrong-way driving for the observed trajectory 610. In this regard, the entire lane segment need not be within the area 710.

In some instances, a lane segment may only be included in the first set of candidate lane segments for wrong way driving if the start or beginning of the lane segment is within the area of the first threshold distance. In such instances, the first set of candidate lane segments in the example of FIG. 7B may include only lane segments B, C, E, F, and H.

Returning to FIG. 10, at block 1030, a second set of candidate lane segments for not wrong-way driving are identified from the map information. A second set of one or more not-wrong-way candidate lanes may include additional candidate lanes. These additional candidate lanes may be identified based on a second threshold distance from the observed trajectory. This second threshold distance may therefore be greater than the first threshold distance, such as a radial distance of 10 meters, 12 meters, or 14 meters or more or less.

Figure 8A:
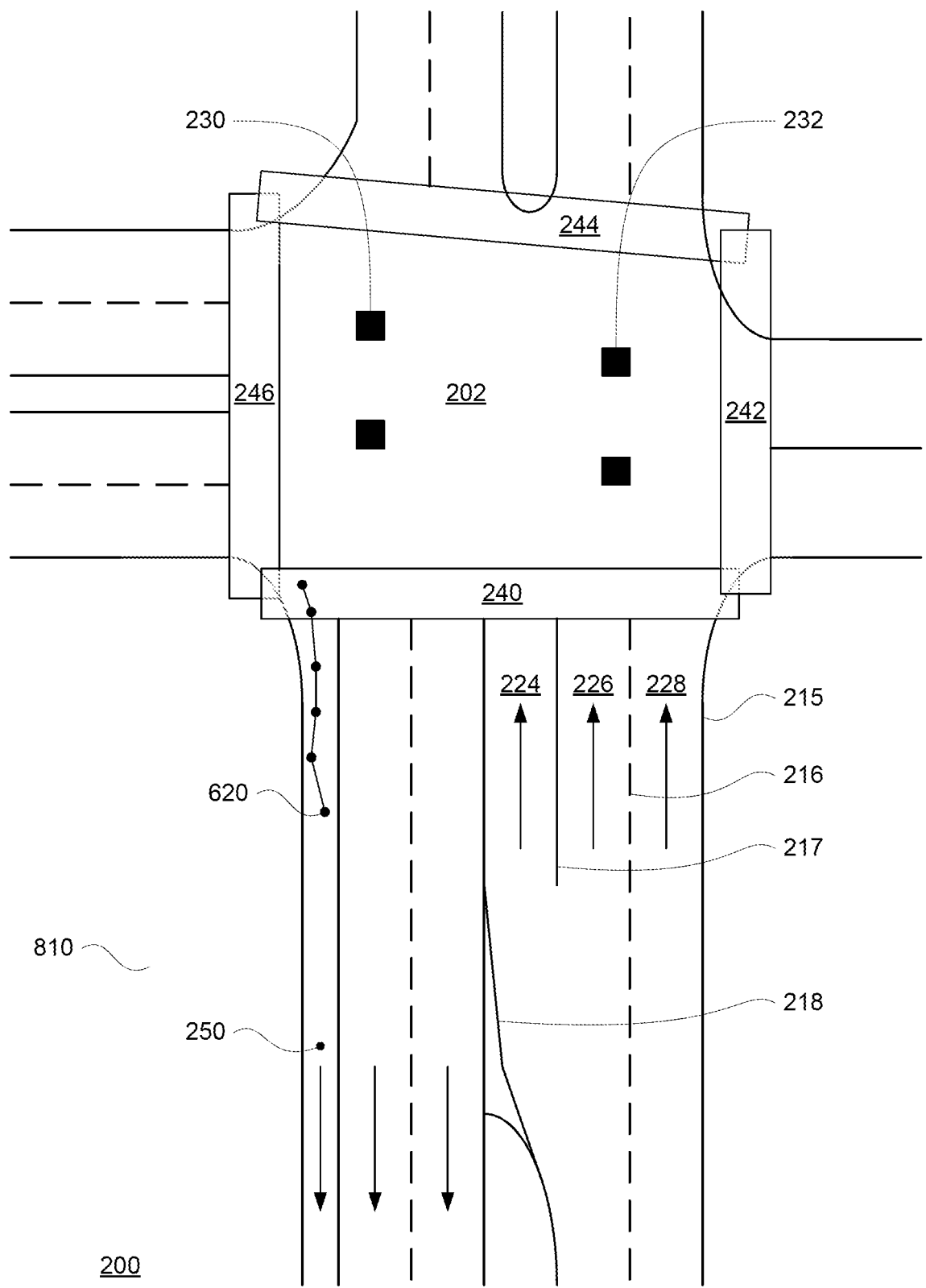
FIG. 8A is an example of map information, log data, and a threshold area in accordance with aspects of the disclosure.
Figure 8B:
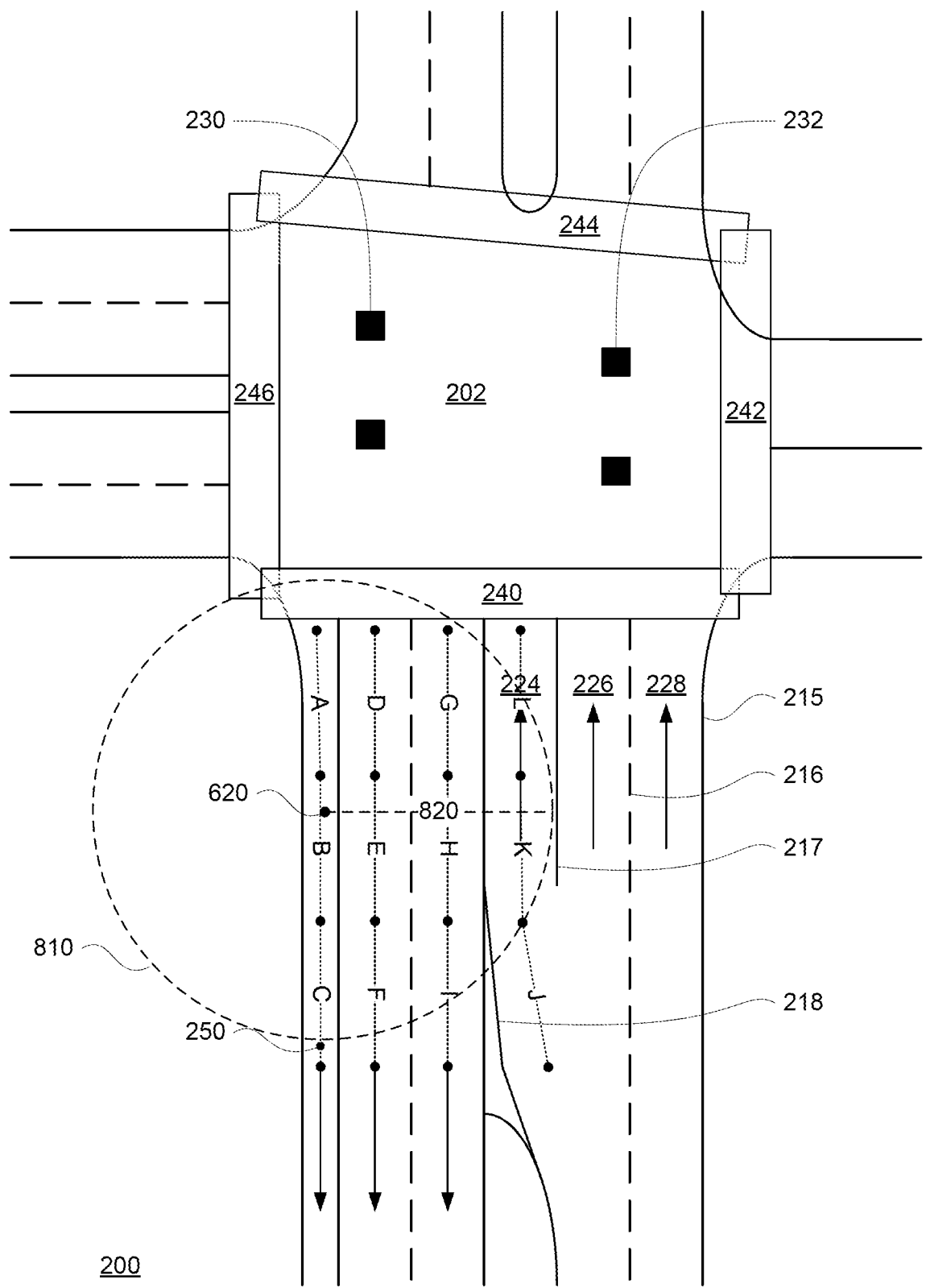
FIG. 8B is an example of map information, a threshold area and other data in accordance with aspects of the disclosure.

For example, turning to FIG. 8A, the area 810 represents a second threshold distance 820 from the observed trajectory 610 at location 620. Turning to FIG. 7B, each of lane segments A, B, C, D, E, F, G, H, K and L may each be at least partially within the areas 810 of the second threshold distance 820 of the observed trajectory 610 at location 620. In this regard, the second set may include lane segments A, B, C, D, E, F, G, H, K and L.

Returning to FIG. 10, at block 1040, for each candidate lane segment in the first set and in the second set, a distance cost between the candidate lane segment and the observed trajectory is determined. For each candidate lane segment of the first and second set, the server computing devices 410 may determine a distance cost with respect to the observed trajectory of the object.

For instance, the distance cost may be determined by taking an average of the distances (for example, in meters) between each of the locations of the observed trajectory and a corresponding closest point on the candidate lane segment from either the first set or the second set. An additional penalty or cost may be determined based on a heading difference between the observed trajectory and the candidate lane segment. However, the "heading" of the candidate lane segment used to determine the distance cost may depend upon whether the candidate lane segment is in the first or the second set. For example, the heading used for the candidate lane segments in the first set may be adjusted 180 degrees from the heading of the candidate lane segment defined in the map information. As such, the opposite heading is used and thereby these candidate lane segments correspond to wrong way driving. Similarly, the heading used for the candidate lane segments in the first set may be the heading of the candidate lane segment defined in the map information (for example, not adjusted). As such, the heading is used and thereby these candidate lane segments correspond to not wrong way driving.

As an example, the additional cost may be determined by taking the cosine of the greatest angular difference between the direction (for example, heading) of the observed trajectory and the heading of the candidate lane segment (also defined in the aforementioned map information). In one example, the distance cost may be represented by the following equation:

$$C_{Lane\ Segment} = \text{SQUARE\_DISTANCE}(\text{Position}_{obs}, \text{Position}_{ClosestPointLaneSegment}) * (2-\cos(\text{Diff}(\text{Heading}_{obs}, \text{Heading}_{ClosetPointLaneSegment})))$$

In this example, $C_{Lane\ Segment}$ may represent the overall cost of a candidate lane segment. The "SQUARE_DISTANCE ($\text{Position}_{obs}$, $\text{Position}_{ClosestPointLaneSegment}$)" may represent the aforementioned distance cost. SQUARE_DISTANCE may represent a code which computes the expected value of the distance between a pair of points randomly selected inside the unit square in two dimensions. $\text{Position}_{obs}$ may represent a position on the observed trajectory and $\text{Position}_{ClosestLaneSegment}$ the closest point on the candidate lane segment to that position on the observed trajectory. The additional cost may be represented by "(2−cos (Diff(Heading$_{obs}$, Heading$_{ClosetPointLaneSegment}$)))". In this regard, Diff may represent the angular difference (for example, subtraction) between two headings. Here, Heading$_{obs}$ refers to between each observed heading of the position on the observed trajectory, and Heading$_{ClosetPointLaneSegment}$ refers to the heading of the closest point on the candidate lane segment to the position on the observed trajectory. Again, this heading may depend whether the candidate lane segment is in the first set or the second set. In this regard, the distance cost for the same candidate lane segment may be determined twice if the candidate lane segment is included in both the first set and the second set. For instance, in the example of FIGS. 7A and 7B, each of lane segments A, B, C, D, E, F, G and H may be included in the first set and the second set as candidate lane segments, and therefore, a distance cost may be determined using different heading values for each of these candidate lane segments.

As the value of the difference between the two headings (Heading$_{obs}$−Heading$_{ClosetPointLaneSegment}$) approaches 180 degrees or −180 degrees (corresponding to opposite of the heading or adjusted heading of the candidate lane segment), the greater the overall cost. Similarly, as the difference between the two headings approaches zero, the lesser the overall cost. For example, the cos (180) or cosine of 180, which would correspond to driving in the opposite direction as the heading (if from the second set) or adjusted heading (if from the first set) of the candidate lane segment, is negative 1, so the cost (2−−1) would be 3. Conversely, cos (0) or cosign of 0, which would represent driving in the same direction as the heading (if from the second set) or adjusted heading (if from the second set) of the candidate lane segment, is 1, so the cost (2−1) would be 1.

A distance cost may also be determined for each candidate lane of the second set by taking an average of the distances (for example, in meters) between each of the locations of the observed trajectory and a corresponding closest point on the candidate lane segment. An additional penalty or cost may be determined based on a heading difference between the observed trajectory and the candidate lane segment as described above. As such, total costs (including distance costs and additional costs) may be determined for each of candidate lane segments from each of the first and second sets.

Figure 9:
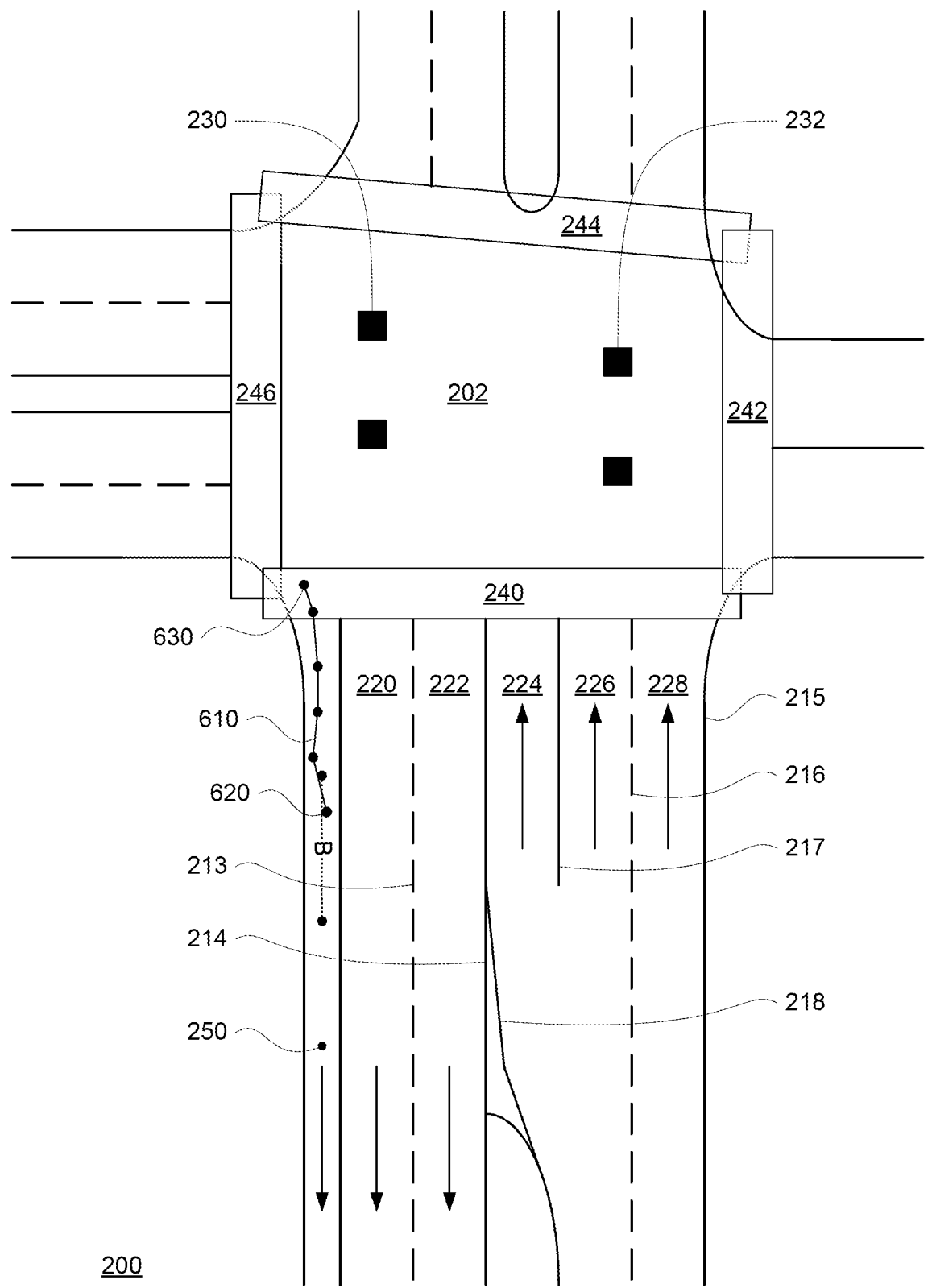
FIG. 9 is an example of map information and data in accordance with aspects of the disclosure.

Returning to FIG. 10, at block 1050, a candidate lane segment is selected from at least one of the first set or the second set based on the determined distance costs. For instance, the candidate lane segment of the first and second sets that best matches the observed trajectory or rather, having the lowest distance cost may be associated with the road user. If the candidate lane segment is of the first set, the log data for the road user may be labeled as wrong-way driving observed. If the candidate lane segment is of the second set, the log data for the road user may be labeled as wrong-way driving not-observed. The candidate lane segment or the lane may also be associated with the labels and/or log data for the road user. Referring to FIG. 9, the lane segment B may have the lowest total cost and is within the first set of candidate lane segments. As such, lane segment B and/or lane (here shoulder area 250) may be selected and associated with or otherwise used to label the observed trajectory 610 as wrong-way driving.

Returning to FIG. 10, at block 1060, the selected candidate lane segment is used to train a model to provide a likelihood of a second road user being engaged in wrong-way driving in a lane. The labels and log data may then be used to train a model. The model may be a decision tree model, such as a Gradient Boosted Decision Tree (GBDT) model, deep neural network, or other machine learning model. The log data, including for instance the observed trajectories of road users and some relevant portion map information (for example, 100 meters, 200 meters, or more or less around the first observed location of the road user or around the location from which the road user was observed) may be used as training inputs, and the labels and associated lanes (or lane segments) may be used as training outputs. The model may be trained to provide a list of candidate lanes (or candidate lane segments) for each road user and an estimate of how likely the road user is to be engaged in wrong-way driving. In this regard, the labels may include discrete values, such as 1 for wrong-way driving occurred and 0 for wrong-way driving not-occurred. Referring back to FIG. 7, the model may be trained such that if the observed trajectory 610 and a candidate lane or lane segment are input into the model, the model may generate a value indicative of how likely the road user is to be wrong-way driving at that lane or lane segment. In this regard, the model may be trained such that when the observed trajectory 610, shoulder area 250 or lane segment B (as a candidate lane or candidate lane segment) as well as the map information 200 are input into the model, the model may output a value of 1 or close to 1 (for example, very likely wrong-way driving) for shoulder area 250 and/or lane segment B.

Separate models may be generated using training data for different types of road users. For instance, one model may be trained using log data for bicyclists and another model may be trained using log data for vehicles. Alternatively, a single model may be trained to provide likelihoods for both types of road users. In such instances, the training inputs may further include the type of the road user.

The model or models may then be provided to an autonomous vehicle in order to enable the autonomous vehicle to determine whether detected road users and their observed trajectories are engaged in wrong-way driving. For instance, the model or models may be incorporated into the autonomous vehicle 100's behavior modeling system 176 in order to provide a likelihood that the road user is engaged in wrong-way driving in any one of a plurality of candidate lanes or lane segments.

For instance, with a decision tree model, an autonomous vehicle's behavior modeling system may process the observed trajectories of each road user. The behavior modeling system may identify a set of candidate wrong-way driving lanes or lane segments. As with the first set, the set of candidate wrong-way driving lanes or lane segments may include all lanes or lane segments within the first threshold distance of the observed trajectory of the road user. Alternatively, a different threshold distance may be used. For example, referring back to FIG. 7, if the object was observed by the autonomous vehicle 100's perception system in real time following the observed trajectory 610, the lane segments A, B, C, D, E, F, G, and H may be included in the set of candidate wrong-way driving lane segments.

Each candidate lane or candidate lane segment, the observed trajectory for a road user, and map information may then be input into the model. Again, the model may first be selected from a plurality of models based on the type of the road user (for example, bicyclist or vehicle). Thereafter, again, for example, referring back to FIGS. 7A and 7B, if the object was observed by the autonomous vehicle 100's perception system in real time following the observed trajectory 610, each of lane segments A, B, C, D, E, F, G, and H, the observed trajectory 610, and the map information 200, may be inputted into the model.

The model may then output a value, for instance on a scale of 0 to 1 indicating how likely the road user is to be engaged (and potentially continue to be engaged) in wrong-way driving on the candidate lane (or candidate lane segment). For example, referring back to FIG. 7, if the object was observed by the autonomous vehicle 100's perception system in real time following the observed trajectory 610, the values for the candidate lane segments A, C, D, E, F, G, and H may be lesser than the values for the candidate lane segment B.

A third threshold value may then be used to filter out low likelihood candidate lanes (or lane segments). This threshold value may be manually selected based on precision and recall values appropriate for the autonomous vehicle and its various systems. As an example, the threshold value may be 0.05, 0.1, 0.2 or more or less. As such, the values for each of lane segments A, B, C, D, E, F, G, and H may be compared to the threshold value. Any lane segments that do not meet the threshold value may be discarded. In this example, based on their distance, G and H may be most likely to be discarded.

Any remaining candidate lanes (or lane segments) and associated values (for example, likelihoods) may then be published by the behavior modeling system 176 and used by other systems of the autonomous vehicle 100. The behavior modeling system 176 may also predict a road user's future trajectory (and likelihood) based on the published candidate lanes (or lane segments). Then the predicted future trajectory along with its corresponding lane candidate will be published to other systems of the autonomous vehicle's various systems. For instance, the autonomous vehicle's planning system 168 may use the published lanes or lane segments and values for trajectory planning. For example, given the behavior prediction (for example, predicted future trajectory for the road user), the autonomous vehicle 100's planning system 168 may add constraints based on these trajectories when generating trajectories for controlling the autonomous vehicle 100 in an autonomous or semi-autonomous driving mode.

As noted above, the features described herein may provide for the modeling of wrong-way driving of other road users or road users such as vehicles and bicyclists. This may enable autonomous vehicles to predict the future behavior of these road users which may improve the safety of autonomous vehicles as well as the comfort of passengers of those autonomous vehicles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method comprising:
accessing, by one or more processors of one or more server computing devices, log data associated with a first autonomous vehicle and including a logged trajectory of a logged road user;

adjusting, by the one or more processors based on map information and the logged trajectory of the logged road user, respective headings of a first set of candidate lane segments, the first set of candidate lane segments being associated with wrong-way driving;

for each candidate lane segment of the first set of candidate lane segments, determining, by the one or more processors based on the adjusted heading of the candidate lane segment and the logged trajectory of the logged road user, a respective distance cost;

for each candidate lane segment of a second set of candidate lane segments, determining, by the one or more processors based on the map information, the logged trajectory and a heading of the candidate lane segment, a respective distance cost, the second set of candidate lane segments being associated with not-wrong-way driving;

selecting, by the one or more processors based on the distance costs for the first set of candidate lane segments and the distance costs for the second set of candidate lane segments, one of the candidate lane segments of the first set of candidate lane segments or the second set of candidate lane segments;

using, by the one or more processors, the selected candidate lane segment to train a model to provide a likelihood of a road user being engaged in wrong-way driving; and providing, by the one or more processors, the trained model to a second autonomous vehicle in order to enable the second autonomous vehicle to estimate a likelihood of an observed road user being engaged in wrong-way driving.

2. The method of claim 1, further comprising, prior to adjusting the respective headings of the first set of candidate lane segments, identifying the candidate lane segments of the first set of candidate lane segments based on a first threshold distance from the logged trajectory.

3. The method of claim 2, wherein the first threshold distance is a radial distance.

4. The method of claim 2, further comprising, prior to determining the distance costs for the second set of candidate lane segments, identifying the second set of candidate lane segments based on a second threshold distance from the logged trajectory.

5. The method of claim 4, wherein the second threshold distance is greater than the first threshold distance.

6. The method of claim 1, further comprising assigning a value to the selected candidate lane segment based on whether the selected candidate lane segment is from the first set of candidate lane segments or the second set of candidate lane segments.

7. The method of claim 6, wherein the value indicates that wrong-way driving occurred when the selected candidate lane segment is from the first set of candidate lane segments.

8. The method of claim 6, wherein the value indicates that wrong-way driving did not occur when the selected candidate lane segment is from the second set of candidate lane segments.

9. The method of claim 1, wherein;
the logged trajectory includes one or more locations, and
determining the distance costs for the first set of candidate lane segments or the second set of candidate lane segments is further based on an average of distances between each location of the logged trajectory and a closest location on the candidate lane segment.

10. The method of claim 1, wherein the distance costs for the first set of candidate lane segments or the second set of candidate lane segments is further based on a heading cost.

11. The method of claim 10, wherein, for the first set of candidate lane segments, the heading cost is based on a cosine of an angular difference between a heading of the logged trajectory and the adjusted heading of the candidate lane segment.

12. The method of claim 10, wherein, for the second set of candidate lane segments, the heading cost is based on a cosine of an angular difference between a heading of the logged trajectory and the heading of the candidate lane segment.

13. The method of claim 1, wherein the model is trained to provide likelihoods for bicyclists.

14. The method of claim 1, wherein the model is trained to provide likelihoods for vehicles.

15. The method of claim 1, wherein the model is a decision tree model.

16. The method of claim 1, wherein the model is a deep neural network.

17. The method of claim 1, wherein the selected candidate lane segment has a lowest of the distance costs.

18. A system comprising one or more processors configured to:
access log data associated with a first autonomous vehicle and including a logged trajectory of a logged road user;
adjust, based on map information and the logged trajectory of the logged road user, respective headings of a first set of candidate lane segments, the first set of candidate lane segments being associated with wrong-way driving;
for each candidate lane segment of the first set of candidate lane segments, determine, based on the adjusted heading of the candidate lane segment and the logged trajectory of the logged road user, a respective distance cost;
for each candidate lane segment of a second set of candidate lane segments, determine, based on the map information, the logged trajectory and a heading of the candidate lane segment, a respective distance cost, the second set of candidate lane segments being associated with not-wrong-way driving;
select, based on the distance costs for the first set of candidate lane segments and the distance costs for the second set of candidate lane segments, one of the candidate lane segments of the first set of candidate lane segments or the second set of candidate lane segments;
use the selected candidate lane segment to train a model to provide a likelihood of a second road user being engaged in wrong-way driving; and
provide the trained model to a second autonomous vehicle in order to enable the second autonomous vehicle to estimate a likelihood of an observed road user being engaged in wrong-way driving.

* * * * *